May 8, 1951 W. N. JUSTICE 2,552,046
MACHINE FOR TENDERIZING FRANKFURTERS
Filed May 20, 1949 3 Sheets-Sheet 1

Inventor,
William N. Justice
BY Mason, Fenwick & Lawrence,
Attorneys

May 8, 1951  W. N. JUSTICE  2,552,046
MACHINE FOR TENDERIZING FRANKFURTERS
Filed May 20, 1949  3 Sheets-Sheet 2

INVENTOR.
William N. Justice
BY
Mason, Fenwick & Lawrence
Attorneys

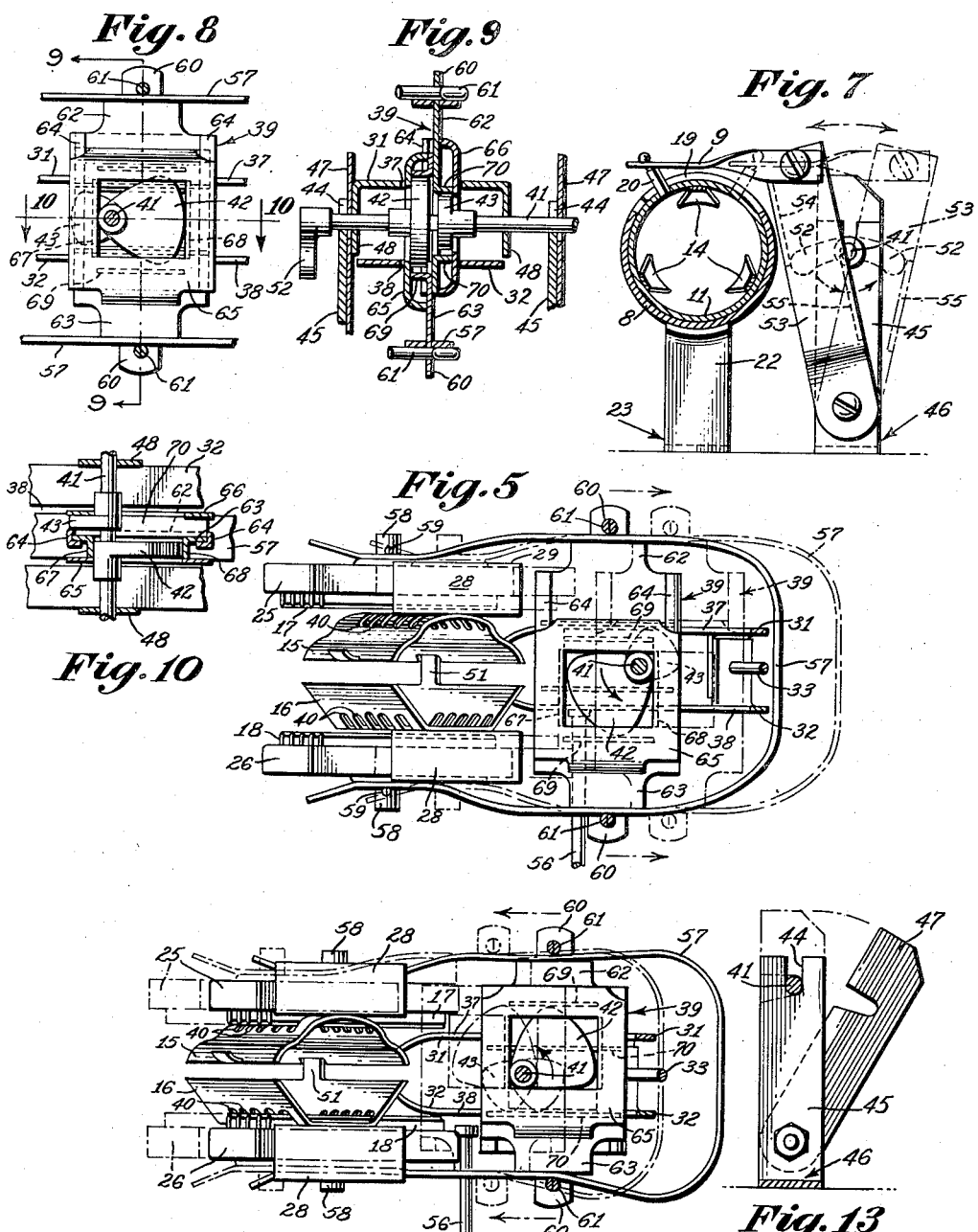

Patented May 8, 1951

2,552,046

UNITED STATES PATENT OFFICE 2,552,046

MACHINE FOR TENDERIZING FRANKFURTERS

William N. Justice, Baltimore, Md.

Application May 20, 1949, Serial No. 94,287

9 Claims. (Cl. 17—25)

This invention relates to a device for tenderizing and improving the cooking qualities of frankfurters by slitting the skin or other covering membrane of the frankfurters so as to divide the skin into a plurality of small areas.

When a frankfurter is cooked in the ordinary manner with intact skin, the juices within the skin are raised to boiling point and the contents of the skin are actually steam cooked, even though the frankfurter is cooked in the frying pan or broiled. When the skin or other covering is slitted, the slits widen due to shrinking in cooking, the meat exudes through the slits, where it is subjected to the searing incident to frying or broiling and develops a fried or broiled flavor which greatly enhances the deliciousness of the sausage.

On July 2, 1940, Patent 2,206,256 was granted to me, covering a tenderized frankfurter and the method of producing the same, having the skin thereof slitted so as to divide the skin into a plurality of small areas. The present invention is an improvement upon the machine described in said patent for producing such a frankfurter.

One of the objects of the present invention is to provide a device for producing a lattice pattern of intersecting slits over the surface of a frankfurter.

Another object of the invention is to provide a machine of the type described, simple in construction and operation, and which can be purchased inexpensively, adapting it as a household kitchen accessory.

Still another object of the invention is the provision of a device of the character described, which can be conveniently cleaned under a tap after use.

Other objects of the invention will appear as the following description of a preferred and practical embodiment thereof proceeds.

In the drawing which accompanies the following specification and throughout the figures of which the same reference characters have been used to denote identical parts:

Figure 5 is a side elevation of the slitting mechanism unit, parts being in section, showing the position of parts when the gripping jaws are approaching full open position;

Figure 6 is a similar view with the jaws approaching fully closed or contracted position;

Figure 7 is a detail of the feeding mechanism, partly in vertical elevation and partly in vertical cross-section;

Figure 8 is a side elevation of the compound cross head for actuating the slitting mechanism unit;

Figure 9 is a section taken along the line 9—9 of Figure 8.

Figure 10 is a longitudinal cross-section taken along the line 10—10 of Figure 9;

Figure 13 is a view in elevation, partly in section, of the latch means for releasing the hand crank shaft from its fixed bearing in opening the machine for washing.

Figure 1:
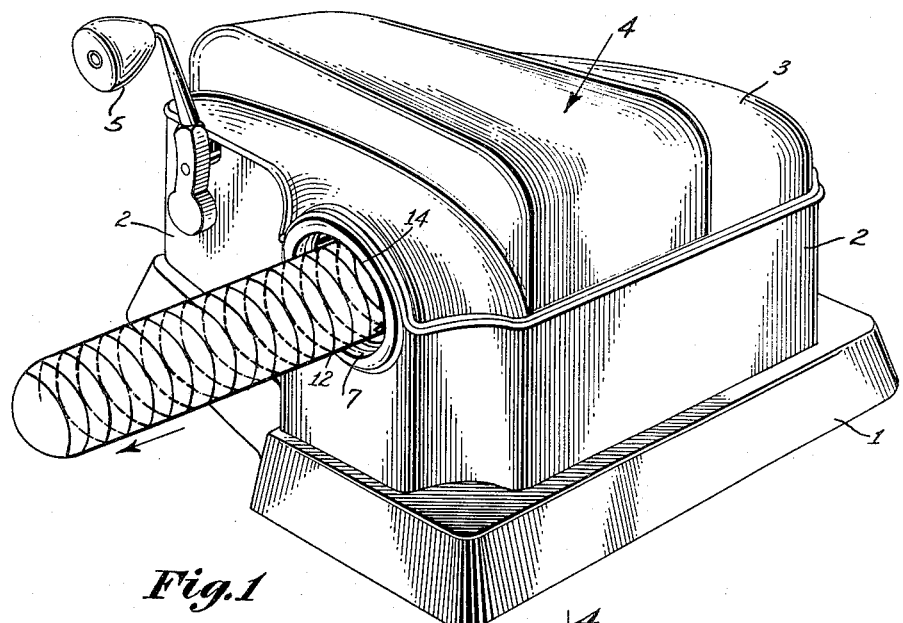
Figure 1 is a perspective view of a frankfurter tenderizing machine embodying the principles of the invention, showing the frankfurter emerging.
Figure 2:
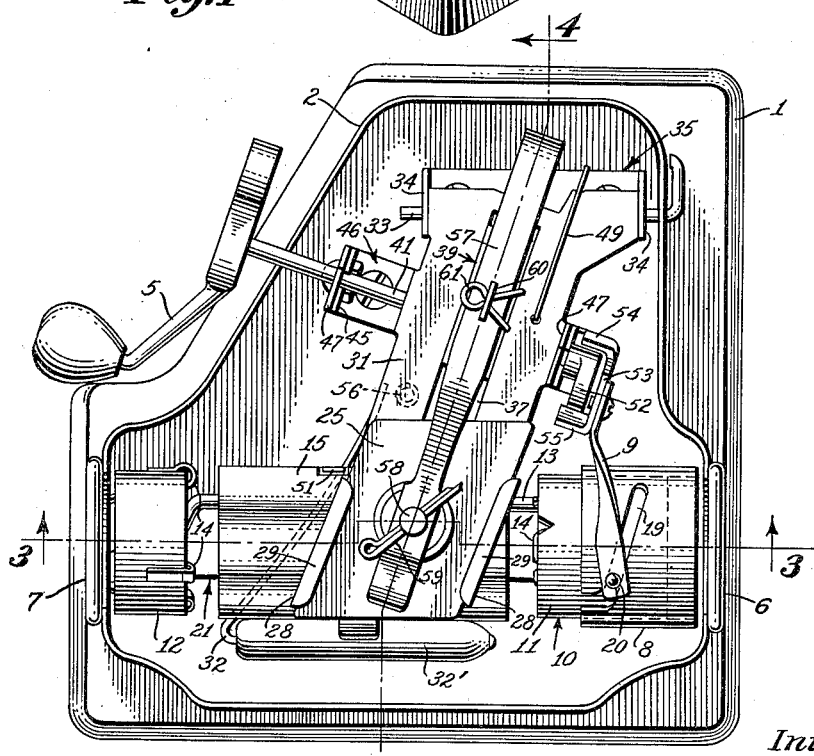
Figure 2 is a plan view, the cover being removed.
Figure 3:
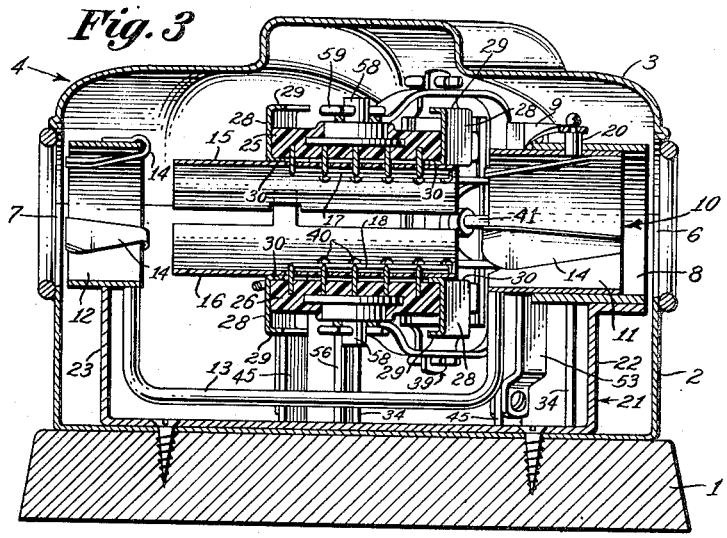
Figure 3 is a vertical section taken along the line 3—3 of Figure 2.
Figure 11:
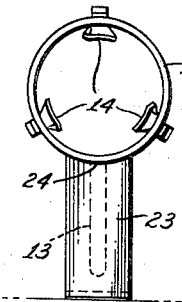
Figure 11 is an end elevation of the discharge end of the feed tube.
Figure 12:
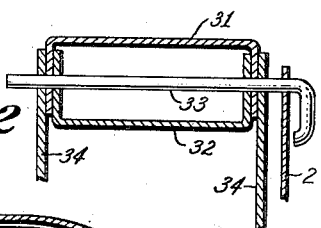
Figure 12 is a cross-section taken along the line 12—12 of Figure 4.
Figure 4:
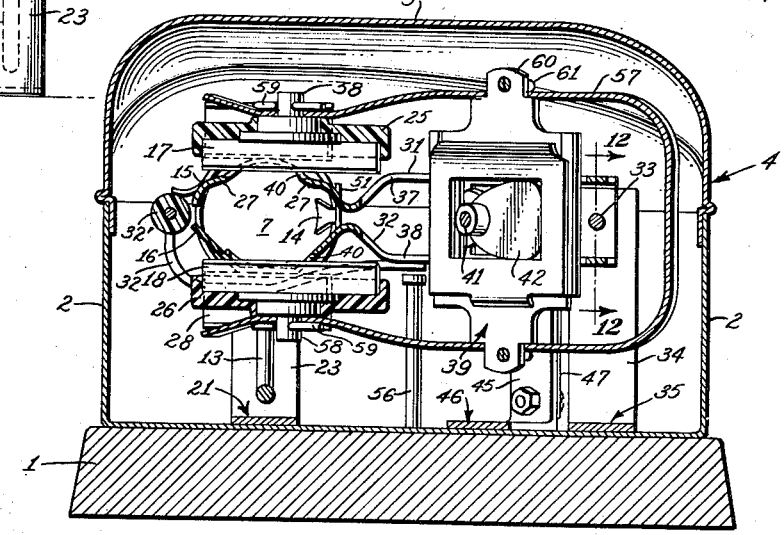
Figure 4 is a vertical section taken along the line 4—4 of Figure 2.

Referring now in detail to the several figures, there is a base 1, which with a side wall 2 and cover 3, form a casing 4 for all of the mechanism except the hand crank 5 by which it is operated.

The casing has aligned holes 6 and 7 in its opposite sides, large enough to freely receive a frankfurter. The frankfurter is introduced at 6 and comes out at 7. Adjacent the hole 6 is the coaxial cylindrical bearing 8, which receives one end of a rotary feeding tube 10. This tube is discontinuous in its middle, comprising coaxial end sections 11 and 12, connected by an offset rod 13 so as to operate as a unit, the section 12 being adjacent the discharge hole 7. The section 11 is the inlet end, and the section 12 the discharge end of the feed tube. The sections are similar on the inside, having light spring leaves 14 distributed circumferentially, with their free ends directed towards the discharge end, adapted to press lightly enough against the frankfurter to cause it to rotate with the feed tube and to adapt the feed tube to fit frankfurters of various diameter. The space between the sections 11 and 12 is for jaws 15 and 16 that periodically grip the frankfurter, and for a gang of parallel spaced knife blades 17 and 18 movable obliquely to the axis of the feed tube and which extend through slots in the jaws.

The bearing 8 has a slot 19 parallel to the blades, and the inlet section 11 of the feed tube has a pin 20 which plays in the slot. The pin is connected to a reciprocable link 9. Said pin moves forward when the jaws are released, so that the frankfurter is permitted to turn with the feed tube and to advance axially. The shape of the slot 19 and the amplitude of arcuate movement of the feed tube determine the extent of advance of the frankfurter at each forward step. The values of these factors are determined so that the advance step is equal to the distance between adjacent blades of the gang.

When the pin is moved backwards, the jaws are gripping the frankfurter so that the feed tube turns upon the frankfurter and the latter is not drawn back by the retrograde movement of the feed tube. It is while the frankfurter is held immobilized by the jaws 15 and 16 that the knife blades do their work, sliding in a forward direction. The depth of penetration of the knives is such that the length of the slits produced thereby is so related to the arcuate displacement of the frankfurter at each step, that after each step of advance of the frankfurter the slits cut by the knife blades will be continuations of slits already formed. Thus, each gang of knife blades eventually cuts a series of parallel continuous spirals throughout the length of the frankfurter.

Since the upper and lower gangs of knife blades are parallel, but the lower gang is diametrically opposite the upper gang, the slits made by one will intersect the slits made by the other, producing the lattice pattern.

The necessity for having the discharge end section 12 of the feed tube is explained by the fact that if the frankfurter has advanced until its posterior end has passed out of the inlet section 11, it still has some distance to go before it is beyond the zone of operation of the knife blades. Being still engaged by the discharge end section 12 of the feed tube which moves unitary with the inlet section, it remains under control of the feed mechanism and advances step by step until the posterior end clears the jaws. Then it will no longer advance, but simply turn back and forth with the feed tube. This is a sign that it is finished, and the housewife takes it out from the discharge hole 7.

Secured to the base 1 of the casing 4 is a C-shaped frame 21, one leg 22 of which carries the bearing 8, while the other leg 23 has a circular arcuate depression 24 in its upper end, forming an incomplete bearing in which the end section of the feed tube rests. This seems preferable to a complete cylindrical bearing, as it gives the feed tube some freedom of deviation from rigid axial alignment with the gripping jaws, facilitating the passage through the device of frankfurters which may be more or less curved.

The slitting mechanism unit includes the jaws 15 and 16, the slidable knife blocks 25 and 26 carrying the knife blades 17 and 18; the means for operating the knife blocks and jaws, and means for operating the feed tube.

The jaws 15 and 16 which are alike, are arranged between the sections 11 and 12 of the feed tube and open and close substantially symmetrically with respect to the axis of the feed tube. The jaws are preferably not cylindrical in contour, but longitudinally outwardly convex in the middle, and to enhance their gripping quality they are provided with re-entrant corrugations 27 at each side of the outwardly convex portion so as slightly to deform the frankfurter under pressure of the jaws. Said jaws are formed with a series of evenly spaced parallel slots 40, oblique to the axis of the feed tube, and said slots on both jaws run in the same direction.

Secured to the outside of the top of one jaw and the bottom of the other are the channel shaped guides 28 for the knife blocks 25 and 26, said guides having upper and lower flanges 29 and 30 which embrace opposite sides of the respective knife blocks and are wider apart than the thickness of the knife blocks, so that there is lost motion between the knife blocks and jaws, for a reason that will appear, the jaws being operated through the knife blocks. The guides 28 are parallel to the slots 40.

The jaws 15 and 16 are at the ends of levers 31 and 32, hingedly mounted on a pin 33, supported parallel to the axis of the feed tube 10 at the upper ends of the legs 34 of a frame 35, secured to the base of the casing. Said levers have the form of similar frames of appreciable width with lapping perforated ears 36 at one end engaging the pin 33, and which space the frames apart at their hinged end. The frames are provided with vertically congruent slots 37 and 38, in which a compound cross head 39 plays, said cross head being instrumental in the operation of the knife blocks and jaws. Since the knife blocks slide oblique to the axis of the feed tube, the cross head 39, in the interest of simplicity of construction, is made to move parallel to the knife blocks. Therefore, the levers 31 and 32 are diverted beyond their hinged connection with the pin 33, to cause the slots 37 and 38 in which the cross head plays, to be parallel to the knife blocks.

The operating shaft 41 which carries the hand crank 5 extends within the casing, passing through the cross head 39 perpendicular thereto and carrying the fixed oppositely disposed cams 42 and 43 within the cross head, which operate against relatively movable parts of said cross head in a manner to be explained.

The shaft 41 is displaceably carried in open topped slots 44 in the upper ends of legs 45 of a frame 46 secured to the base of the casing, and latches 47 pivoted to said legs and heads that close the upper ends of said slots when said latches are in active position.

The upper lever 31 has down turned lugs 48 with holes in their lower ends that straddle the shaft 41, the lugs resting upon said shaft and supporting the upper jaw so that it will not fall sufficiently within the projected bore of the feed tube to obstruct the passage of a frankfurter. Beneath the lower lever 32 is a stop pin 56 rising from the base 1, which engages the lower lever to prevent said lever falling too far below the feed tube.

The jaws 15 and 16 are biased toward closed position by a light spring 49, which presses against the outside of both of the levers 31 and 32. When occupied by a frankfurter, the jaws are spaced apart. Sometimes a frankfurter is encountered with a longitudinal curvature so pronounced that when advanced through the feeding tube its forward end tends to be forced through the space between the jaws at the front. A spring mounted roller 32' on the lever 32 confronts said space and keeps the end of such frankfurter within bounds, directed toward the discharge end of the feed tube. The space between the jaws at the rear is not so wide as that at the front, being closer to the hinge fulcrum, so there is little risk of the end of a curved frankfurter being forced out at the rear, but as a safeguard, a lug 51 extends up from the lower jaw, bridging said space.

The end of the shaft 41 opposite the hand crank carries a cam 52 in the form of a crank operating outside of the adjacent leg 45 of the frame 46.

A rocking lever 53 is pivotally mounted at its lower end to the lower part of the leg 45 and extends upward beyond the axis of the cam 52, having striking lugs 54 and 55, one above and the other below said axis, and on opposite sides thereof, which said cam alternately engages in its rotation, oscillating the rocking lever 53. The link 9 connects the oscillating lever to the pin 20 of the feed tube.

The shaft 41 is made releasable from its fixed bearings in the legs 45, so that the slitting mechanism unit can be swung out on the pin 33 as an axis, to make the parts of the device independently accessible for washing. When the latches 47 are released and the crank turned to place the cam 52 in a noninterfering position with respect to the striking lugs 54 and 55, the entire slitting mechanism unit may be swung upwardly to a position substantially perpendicular to the base. The feed tube and jaws may then be separately put under a tap of running hot water and thoroughly scalded.

The cross head 39 is harnessed to the upper and lower knife blocks 25 and 26 by a stiff horseshoe shaped leaf spring 57, the bight of which surrounds the hinged ends of the levers 31 and 32 without contacting them, and the ends of which are connected to the respective knife blocks by means such as the boss 58 on the knife block which enters a hole in the leaf spring and is retained by a pin 59, making the knife block with the knife blades conveniently replaceable. The cross head has perforated lugs 60 at its top and bottom, which enter slots in the adjacent limbs of the spring 57 and are secured by pins 61. The cross head is held by said spring and may be said to float in the slots 37 and 38.

The cross head 39 includes a two part intermediate plate consisting of relatively slidable sections 62 and 63, the section 62 having side flanges 64 turned about the corresponding side edges of section 63, forming a slide and guide connection between said sections, whereby the intermediate plate can be extended or contracted. The lugs 60 are at the outer ends of the intermediate plate so that when the cross head is extended the spring 57 is spread. Secured to the sections 62 and 63, parallel thereto and spaced therefrom are the plates 65 and 66 which form with the respective sections of the intermediate plate cam housings for the cams 42 and 43. The intermediate plate has side edges 67 and 68 paralleling the side flanges 64, turned out against the plate 65 and forming an abutment for the large cam 42. It causes the cross head to move horizontally back and forth, since the cam shaft 41 is fixed. This back and forth movement of the cross head imparts similar movement to the spring 57 and the knife blocks carried thereby.

The section 63 of the intermediate plate has outer edges 69, and the section 62 has outer edges 70, said outer edges being turned outwardly toward the respective plates 65 and 66 in position to be engaged respectively by the oppositely disposed large and small cams for extending the vertical length of said cross head. This vertical movement spreads the spring 57. When the combined axis of the large and small cams moves from a position of perpendicularity toward an inclined position with respect to the edges 69 and 70, the spring 57 contracts, diminishing the length of the cross head.

The motion of the cross head produced by a turn of the hand crank 5 may be termed a "square" motion. Beginning with the cross head in contracted condition, the sequence of phases is as follows. The cross head moves forward while contracted, as the large cam presses the forward vertical edge 67; then the cross head elongates vertically under the combined urge of both cams against the horizontal edges 69 and 70 of the respective sections of the cross head; then the cross head moves backward while elongated, under the pressure of the large cam against the rearward vertical edge 68; and finally, the cross head contracts under pressure of the spring 57 as the combined axis of the cams becomes inclined with respect to the horizontal edges 69 and 70.

When the spring 67 is contracted, with minimum spacing between its free ends, the knife blocks are pressed against the jaws so that the blades have entered the slots 40 and assumed a chordal relation to the projected bore of the feed tube. The jaws are also pressed by the knife blocks in the gripping relation to the frankfurter. This represents the contracted position of the cross head. The next movement is the forward thrust of the knife blades while the cross head remains contracted, slitting the frankfurter. Then, responsive to the vertical expansion of the cross head at the end of its forward travel, the spring 57 opens, first raising the knife block to withdraw the knife blades from the frankfurter, and then to engage the flanges 29 of the guides 28 and through them to draw the jaws apart, releasing the frankfurter. On the backward stroke the jaws remain spread and the knife blades, still out of contact with the frankfurter, move back to their starting position.

While the jaws are open and the knife blades are moving backward, the link 9 is moving forward, advancing the frankfurter relative to the slitting zone. While the frankfurter is gripped by the jaws and being slit by the knife blades in their phase of forward movement, the link 9 is retracting the feed tube to the starting position and the next advance step.

This specification and the drawings were made from a hand made working model of the invention, it being therefore understood that the specific details of construction and the arrangement of parts, as shown and described, are by way of example and not to be construed as limiting the scope of the invention.

What I claim as my invention is:

1. Tenderizing device for frankfurters comprising means forming a tubular passage for a frankfurter, having an inlet and a discharge end separated axially but connected for simultaneous rotation, gripping jaws forming an intermediate part of said passage, means operatively connected to said jaws for alternately causing said jaws to grip and release the frankfurter, means in said inlet and discharge ends yieldably engageable with a frankfurter within said passage means for advancing the frankfurter toward the discharge end of said passage during release periods of said jaws, and means operatively positioned between said inlet and discharge ends for slitting the surface of the frankfurter during the gripping periods of said jaws.

2. Tenderizing device for frankfurters comprising means forming a tubular passage for a frankfurter, having an inlet and a discharge end portion, said portions being separated in an axial direction but connected so as to be rotatable as a unit gripping jaws forming the opposite sides of an intermediate part of said passage, means operatively connected to said jaws for causing said jaws alternately to grip and release the frankfurter, means in said inlet and discharge end portions yieldably engageable with a frankfurter within said passage means for actuating the inlet and discharge end portions of said passage as a unit to impart circumferential and axial movement to said frankfurter during the release periods of said jaws operatively positioned between said inlet and discharge end portions, and means for slitting the surface of said frankfurter during the gripping periods of said jaws.

3. Tenderizing device for frankfurters comprising means forming a tubular passage for a frankfurter having an inlet and a discharge end portion with spring means therein frictionally engageable with the frankfurter, said end portions being rigidly connected to be operated as a unit, gripping jaws forming the opposite sides of an intermediate part of said passage, said jaws having slots oblique to the axis of said passage and the slots of both jaws extending in the same direction, means operatively connected to said jaws to cause them alternately to grip the frankfurter with a force dominating that of said spring means, and to release the frankfurter, means connected to the tubular passage forming means and synchronized with said jaw operating means for actuating said inlet and discharge end portions as a unit to impart circumferential and axial movement to said frankfurter during the release periods of said jaws, and knives for each jaw, registrable with the respective slots, and means operatively connected to said knives for causing them to enter depthwise into said slots and to traverse said slots longitudinally thereof during the gripping periods of said jaws.

4. Tenderizing device for frankfurters comprising means forming a tubular passage for a frankfurter having an inlet and a discharge end portion with spring means therein frictionally engageable with the frankfurter, said end portions being rigidly connected to be operated as a unit, gripping jaws forming the opposite sides of an intermediate part of said passage, said jaws having slots oblique to the axis of said passage and the slots of both jaws extending in the same direction, means operatively connected to said jaws to cause them alternately to grip the frankfurter with a force dominating that of said spring means, and to release the frankfurter, means for actuating said inlet and discharge end portions as a unit comprising a bearing surrounding one end portion of said passage having a fixed slot oblique to the axis of said passage, a pin carried by said end portion extending through said slot, an oscillating lever moving synchronously with said jaw operating means, and a link between said pin and lever, knives for each jaw registrable with the respective slots, and means for causing said knives to enter depthwise into said slots, and to traverse said slots longitudinally thereof during the gripping periods of said jaws.

5. Tenderizing device for frankfurters comprising means forming a tubular passage for a frankfurter, having an inlet and a discharge end portion with friction means therein engageable with the frankfurter, said end portions being rigidly connected to be operated as a unit, gripping jaws forming the opposite sides of an intermediate part of said passage, said jaws having each a plurality of spaced parallel slots therethrough oblique to the axis of said passage and the slots of both jaws extending in the same direction, guides on the outer sides of said jaws extending parallel to said slots, knife carriers slidable in said guides each carrying a plurality of knives aligned with said slots, there being lost motion between said carriers and guides in a radial direction with respect to the axis of said passage, means operatively connected to said knife carriers and to said jaws, movable in cyclic sequence for reciprocating said knife carriers in said radial direction to cause said knives to move depthwise into said slots, and to press said jaws in gripping relation to the frankfurter with a force dominating that of said friction means, and to release the frankfurter, and to move said carriers to draw said blades longitudinally through said slots during the gripping periods of said jaws, and means for actuating said inlet and discharge end portions as a unit comprising a bearing surrounding one end portion of said passage having a fixed slot oblique to the axis of said passage, a pin carried by one of said end portions extending through said slot, an oscillating lever moving synchronously with said reciprocating means, and a link between said pin and lever.

6. Tenderizing device for frankfurters comprising means forming a tubular passage for a frankfurter, having an inlet and discharge end portion with friction means therein engageable with the frankfurter, said end portions being rigidly connected to be operated as a unit, gripping jaws forming the opposite sides of an intermediate part of said passage, said jaws having each a plurality of equally spaced parallel slots therethrough oblique to the axis of said passage and the slots of both jaws extending in the same direction, guides on the outer sides of said jaws extending parallel to said slots, knife carriers slidable in said guides each carrying a plurality of knives aligned with said slots, there being lost motion between said carriers and guides in a radial direction with respect to the axis of said passage, means operatively connected to said knife carriers and to said jaws, movable in cyclic sequence for reciprocating said carriers in said radial direction to cause said knives to move depthwise into said slots, and to press said jaws in gripping relation to the frankfurter with a force dominating that of said friction means, and to release the frankfurter, and to move said carriers to draw said blades longitudinally through said slots during the gripping periods of said jaws, means for actuating said inlet and discharge end portions as a unit to move said frankfurter circumferentially and to advance it step by step toward the discharge end, said means comprising a bearing surrounding one end portion of said passage having a fixed slot oblique to the axis of said passage, a pin carried by said end portion extending through said slot, an oscillating lever moving synchronously with said reciprocating means, and a link between said pin and lever, said fixed slot being parallel to the slots in said jaws, and the advance at each step being equal to the space between adjacent slots of said jaws.

7. Tenderizing device for frankfurters comprising means forming a tubular passage for a frankfurter having an inlet and a discharge end portion with friction means therein engageable with a frankfurter, said end portions being rigidly connected to be operated as a unit, gripping jaws forming the opposite sides of an intermediate part of said passage, said jaws being at one end of levers hinged at their opposite end on a common axis parallel to that of said tubular passage, said jaws having each a plurality of spaced slots therethrough oblique to the axis of said passage and the slots of both jaws extending in the same direction, guides on outer sides of said jaws extending parallel to said slots, knife carriers slidable in said guides each carrying a plurality of knives aligned with said slots, there being lost motion between said carriers and guides in a radial direction with respect to the axis of said passage, superposed slots in said levers between said jaws and hinge axis parallel to the slots in said jaws, a cross head floatably mounted in the slots in said levers, said cross head being expansible vertically, a U-shaped leaf spring having its ends fastened to said knife carriers, its bight freely surrounding the hinge axis of said levers and its limbs intermediately fastened to the top and bottom of said cross head, said spring being normally contracted, a driven cam shaft having cams coacting with said cross head to successively contract said cross head, move it forward in the slots in said levers, expand it, and move it rearwardly through said slots, imparting like movements to said leaf spring whereby successively the knives are projected through the slots in the jaws, the jaws pressed into gripping engagement with the frankfurter, the knives drawn forwardly slitting the frankfurter, the knives released radially from the frankfurter and jaw slots, the jaws raised to release position and the knives drawn rearwardly to starting position, means for actuating said inlet and discharge end portions as a unit for imparting step by step circumferential movement and axial advance of said frankfurter, comprising a bearing surrounding one end portion of said passage having a fixed slot oblique to the axis of said passage, a pin carried by said end portion extending through said slot, an oscillating lever, a link between said pin and lever, and a cam on said cam shaft arranged to oscillate said last mentioned lever to advance the frankfurter during the release phase of said jaws.

8. Tenderizing device for frankfurters comprising means forming a tubular passage for a frankfurter having an inlet and a discharge end portion, unitarily connected, mounted for circumferential and axial feeding movement, friction means within said end portions engageable with a frankfurter to cause the latter to move with said end portions, a jaw unit including gripping jaws forming the opposite sides of an intermediate part of said passage having parallel slots therein oblique to the axis of said passage, knives carried by said jaws working longitudinally in said slots, said jaws being at one end of levers hingedly mounted at the other end on a pin parallel to the axis of said passage, cam operated means movable parallel to the slots in the jaws carried by said levers for actuating said jaws and knives, a cam shaft mounted in open bearings perpendicular to the plane of movement of said cam operating means, said cam shaft passing through said cam operated means and having cams coacting therewith, means on said cam shaft for imparting feeding movements to the unitary end portions of said tubular passage during the gripping phases of said jaws, and latches for removably retaining said cam shaft in its bearings, permitting release of the same whereby said jaws can be swung away from the end portions of said passage, about said pin, to facilitate cleaning.

9. Tenderizing device for frankfurters as claimed in claim 3, including means confronting the opening between said jaws to prevent a curved frankfurter being fed laterally through said opening.

WILLIAM N. JUSTICE.

REFERENCES CITED

The following references are of record in the file of this patent:

UNITED STATES PATENTS

| Number | Name | Date |
|---|---|---|
| 884,125 | Brightman | Apr. 7, 1908 |
| 2,206,256 | Justice | July 2, 1940 |
| 2,427,322 | Darner | Sept. 9, 1947 |